United States Patent
Zirwas et al.

(10) Patent No.: US 9,231,676 B2
(45) Date of Patent: Jan. 5, 2016

(54) LOW EFFORT MASSIVE MIMO ANTENNA ARRAYS AND THEIR USE

(71) Applicant: Nokia Solutions and Networks Oy, Espoo (FI)

(72) Inventors: Wolfgang Zirwas, Munich (DE); Berthold Panzner, Holzkirchen (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/274,944

(22) Filed: May 12, 2014

(65) Prior Publication Data

US 2015/0326285 A1   Nov. 12, 2015

(51) Int. Cl.
H04B 7/02 (2006.01)
H04B 7/04 (2006.01)

(52) U.S. Cl.
CPC .................................... H04B 7/0452 (2013.01)

(58) Field of Classification Search
CPC .......... H04B 1/0483; H04B 7/00; H04B 7/02; H04B 7/022; H04B 7/024; H04B 7/026; H04B 7/04; H04B 7/0404; H04B 7/0408; H04B 7/0413
USPC .......... 375/259, 260, 267, 295, 299, 285, 296
See application file for complete search history.

(56) References Cited

U.S. PATENT DOCUMENTS

2010/0328157 A1* 12/2010 Culkin et al. .................. 342/372
2013/0237218 A1* 9/2013 Li et al. ......................... 455/434
2013/0286960 A1 10/2013 Li et al.
2014/0113676 A1 4/2014 Hamalainen et al.
2014/0203969 A1* 7/2014 Maltsev et al. ................ 342/375
2014/0204902 A1* 7/2014 Maltsev et al. ................ 370/331

FOREIGN PATENT DOCUMENTS

WO     WO 9952311 A1    10/1999

OTHER PUBLICATIONS

"$3^{rd}$ Generation Partnership Project; Technical Specification Group Radio Access Network; Evolved Universal Terrestrial Radio Access (E-UTRA); Further advancements for E-UTRA physical layer aspects (Release )", 3GPP TR 36.814 V9.0.0, Mar. 2010, 104 pgs.
"$3^{rd}$ Generation Partnership Project; Technical Specification Group Radio Access Network; Coordinated multi-point operation for LTE physical layer aspects (Release 11)", 3GPP TR 36.819 V11.0.0, Sep. 2011, 68 pgs.
"Massive MIMO for Next Generation Wireless Systems", Erik G. Larsson, Ove Edfors, Fredrik Tufvesson, Thomas L. Marzetta, IEEE Communications Magazine, vol. 52, No. 2, pp. 186-195, Feb. 2014, 21 pgs.

* cited by examiner

Primary Examiner — Siu Lee
(74) Attorney, Agent, or Firm — Harrington & Smith

(57) ABSTRACT

An apparatus includes a number of first RF chains configured to be able to be coupled to a plurality of first antennas from an antenna array and a number of second RF chains configured to be able to be coupled to a plurality of second antennas from the antenna array. The first and second antennas are different. The first and second RF chains are configured to create RF signals from baseband signals. The first RF chains have a certain functionality, and the second RF chains have a reduced functionality relative to the certain functionality. The apparatus may include the antenna array. The first and second antennas may have the same or different characteristics. A base station may include the apparatus. Sets of antennas for the second RF chains may be use to create signals used for over-the-air signal combining at a receiver. Methods and program products are also described.

29 Claims, 13 Drawing Sheets

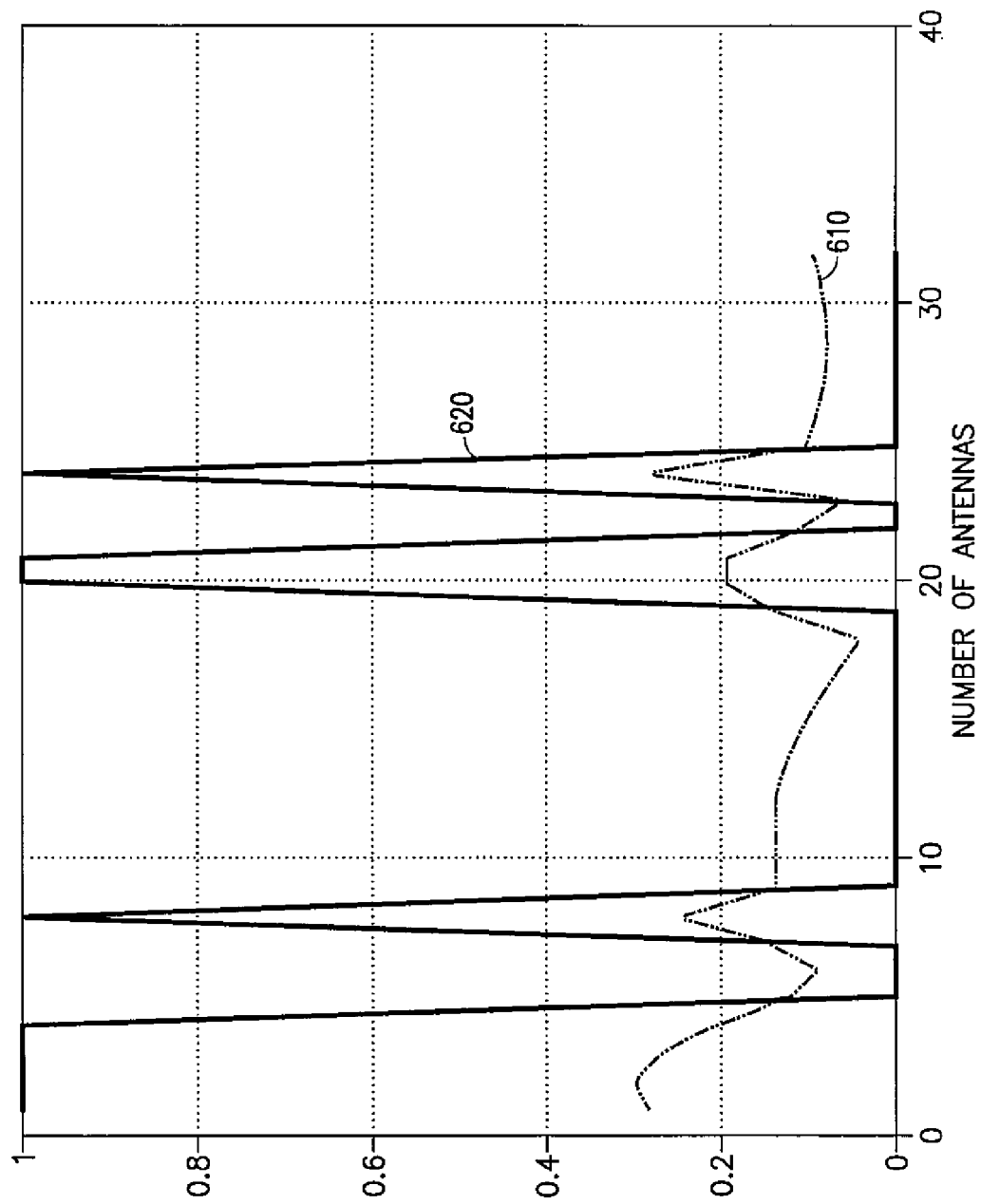

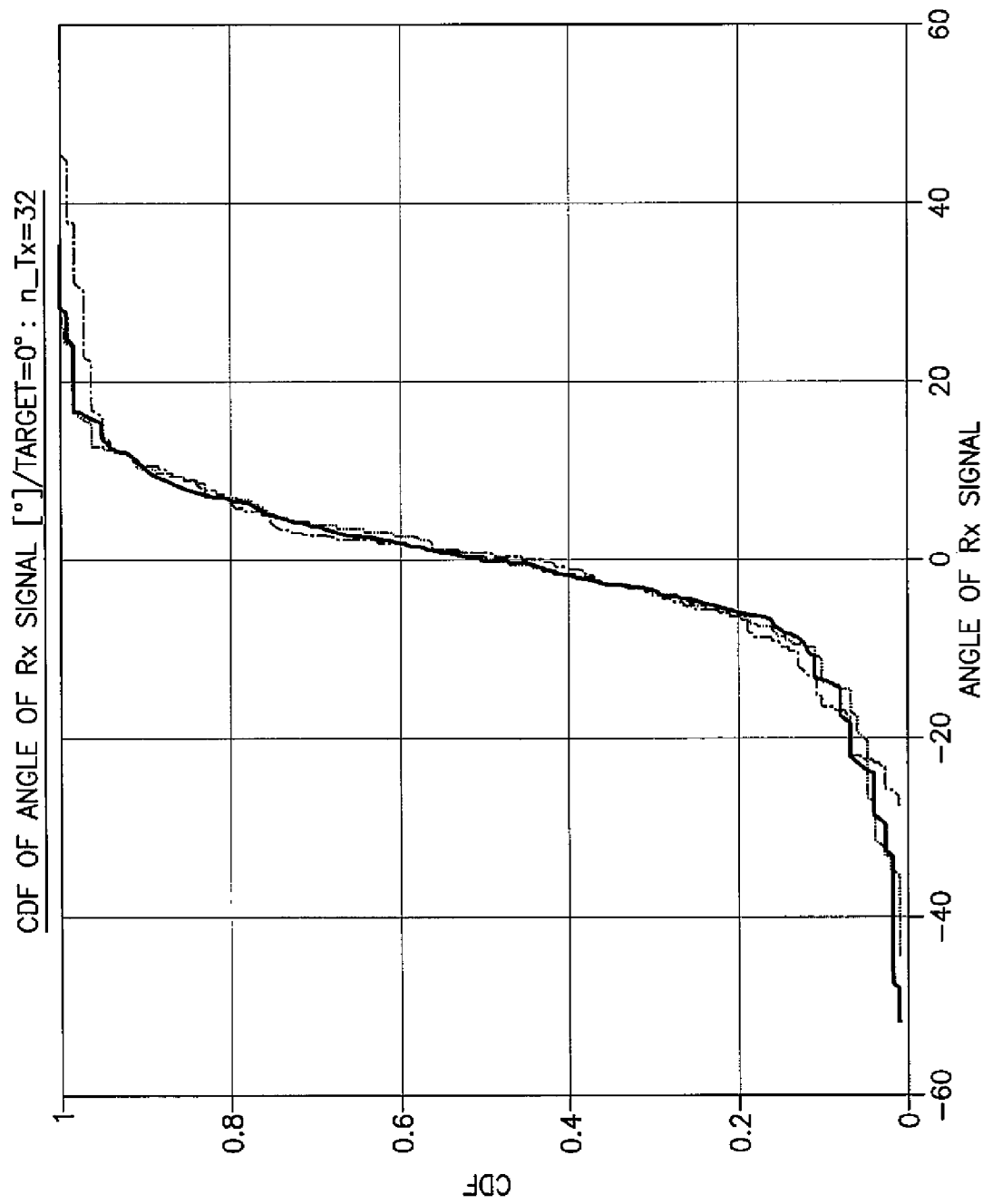

LOW EFFORT MASSIVE MIMO ANTENNA ARRAYS AND THEIR USE

TECHNICAL FIELD

This invention relates generally to wireless communications and, more specifically, to large antenna arrays used for multiple-input, multiple-output (MIMO) communications.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Acronyms used in this application or the drawings are defined below, prior to the claims.

As an overview, activities in the EU-funded project METIS as well as in many other research groups promise large potential gains for systems deploying massive MIMO. The main objective of the METIS project is to lay the foundation of 5G, the next generation mobile and wireless communications systems. MIMO uses multiple antennas to communicate with UEs. Massive MIMO for 5G is currently under the assumption of 100 or more antenna elements, and spectral efficiencies of several tens of bit/s/Hz/cell (e.g., bit or bits per Hertz per cell) have been reported under ideal conditions compared to about 3 bit/s/Hz/cell for a 4×2 MIMO case 1 system in 3GPP (see 3GPP TR 36.819 V11.0.0 (2011-09), table 7.2.1.2-5). Achievable gains in real world conditions are for further study, but it is obvious that having low cost massive MIMO arrays will be of great benefit.

In more detail, the above-mentioned large performance gains are the result of strong multi-user MIMO (MU MIMO) transmission, i.e., the spatial multiplexing of, e.g., ten or more users simultaneously in one time-frequency resource block combined with strong beamforming gains. Beamforming gains are achieved by providing over-provisioning of antenna elements. In the case of a factor of ten times more antennas than served users and greater than ten served UEs, the overall number of antenna elements will be in the order of 100 or more.

Today's LTE systems have as baseline two antenna ports being extendable up to 8×8 MIMO, which is rarely deployed. So there are so far only few RF frontends needed per sector. These RF frontends are currently complex and bulky devices, which contribute a significant part to the overall costs of an eNB.

Straight-forward implementation of large arrays based on one RF frontend per antenna element will lead to exploding costs, power consumption and size of the overall system. See for example the current status of active antennas, where RF frontends per active antenna element are so far in the order of $0.2 \times 0.2 \times 0.1$ m$^3$.

For active antennas, there are currently projects running to reduce the size to about $0.1 \times 0.1 \times 0.05$ m$^3$, which is still far from the ideally intended size of future massive MIMO antenna arrays. For example, the space for the RF frontends for a 256 element antenna array would be in the order of $[0.1 \times 0.1 \text{ m}^2] \times 256 = 2.45$ m$^2$ leading to an overall volume of $2.45 * 0.05$ m$^3 = 0.1225$ m$^3$. In terms of feet, this is about 14.1 ft$^3$.

The typical ideal vision for a future massive MIMO array is for example a flat panel placed at walls with an array of $16 \times 16 = 256$ antennas and a single low cost active device or chip per antenna element containing the full RE chain including the power amplifier (PA) as well as filters and the like. Part of the problem is the relatively high number of complex components per RF chain such as broadband high resolution analog digital converters (ADC and DACs), highly linear power amplifiers plus their control circuits for linearization with large headroom, bulky filters with strong out of band suppression (for example ceramic filters), and the like.

It would be beneficial to reduce the costs for the implementation of massive MIMO arrays, which is a real challenge taking the high number of antenna elements into account.

SUMMARY

This section contains examples of possible implementations and is not meant to be limiting.

In an exemplary embodiment, an apparatus, comprises: a plurality of first radio frequency chains configured to be able to be coupled to a plurality of first antennas from an antenna array; and a plurality of second radio frequency chains configured to be able to be coupled to a plurality of second antennas from the antenna array, wherein the first and second antennas are different; wherein the first and second radio frequency chains are configured to create radio frequency signals from baseband signals, wherein the first radio frequency chains have a certain functionality, and wherein the second radio frequency chains have a reduced functionality relative to the certain functionality of the first radio frequency chains.

In another exemplary embodiment, an apparatus comprises: a base station comprising: a plurality of first radio frequency chains configured to be able to be coupled to a plurality of first antennas from an antenna array; and a plurality of second radio frequency chains configured to be able to be coupled to a plurality of second antennas from the antenna array, wherein the first and second antennas are different; wherein the first and second radio frequency chains are configured to create radio frequency signals from baseband signals, wherein the first radio frequency chains have a certain functionality, and wherein the second radio frequency chains have a reduced functionality relative to the certain functionality of the first radio frequency chains.

In a further exemplary embodiment, a method, comprises: for an apparatus comprising a plurality of first radio frequency chains able to be coupled to a plurality of first antennas from an antenna array, configuring a plurality of second radio frequency chains to perform precoding of the antenna array to meet a selected multiple number of beams to multiple users, wherein the plurality of second radio frequency chains are configured to be able to be coupled to a plurality of second antennas from the antenna array, wherein the first and second antennas are different, wherein the first radio frequency chains also perform precoding of the multiple number of beams to the multiple users, wherein the first and second radio frequency chains are configured to create radio frequency signals from baseband signals, wherein the first radio frequency chains have a certain functionality, and wherein the second radio frequency chains have a reduced functionality relative to the certain functionality of the first radio frequency chains; and performing beamforming with the multiple beams to the multiple users.

BRIEF DESCRIPTION OF THE DRAWINGS

In the attached Drawing Figures:

FIG. 1, including

FIG. 2, including

FIG. 6, including FIGS. 6A and 6B, illustrates the following: in FIG. 6A, the y-axis is the abs(sum of precoding weights) (where abs( ) is absolute value) relative to the number of Tx antennas (x-axis) or is on-off switching of PAs according to abs(sum weight); FIG. 6B is a constellation diagram of Tx signals for all Tx antennas with/without on-off switching of PAs; note certain points are all on a circle—or at zero—due to constant signal strength, while others can take any value within this circle;

FIG. 7, including FIGS. 7A and 7B, illustrates a CDF of Rx signal strength (FIG. 7A) and phase offset (FIG. 7B) for all three UEs for PA on-off switching; and FIG. 8, including

DETAILED DESCRIPTION OF THE DRAWINGS

Figure 1A:
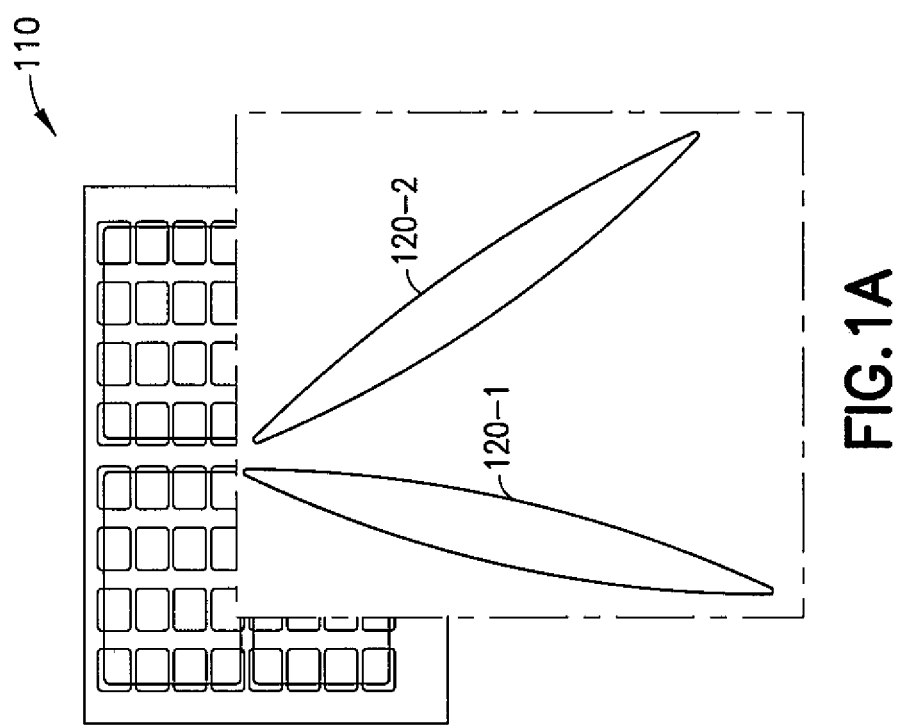
FIGS. 1A and 1B, illustrates an exemplary massive MIMO antenna concept with a few antenna elements (AEs) having full RF chains and most other AEs being limited to very simple on-off PAs for the dumb RF chains.

As indicated above, it would be beneficial to reduce the costs for the implementation of massive MIMO arrays, which is a real challenge taking the high number of antenna elements into account. Different approaches have been proposed for the implementation of massive MIMO arrays, but even first massive MIMO demonstrators are typically bulky, costly and complex. For measurements, often signals measured sequentially have to be stored and combined offline for further analysis.

Several approaches can be found for the design of massive MIMO antenna arrays, where the goal is always to reduce the required effort and costs while keeping beamforming gains and flexibility for beam steering. For instance, see "Massive MIMO For Next Generation Wireless Systems", Erik G. Larsson, Ove Edfors, Fredrik Tufvesson, Thomas L. Marzetta, IEEE Communications Magazine, VOL. 52, NO. 2, PP. 186-195, FEB. 2014.

In a first approach (Approach 1), use is made of only $N \ll N_{AE}$ number of RF chains. It is noted that an RF chain is also referred to as an RF frontend herein. The variable N is adapted to the maximum number of simultaneously served users, while $N_{AE}$ is the overall number of antenna elements. Practically, this means that only a number of, e.g., N=10 instead of NAE=100 of RF chains might be needed. This led for example to hybrid digital-analog antenna concepts, where the digital signals per UE are beam-steered by analog phase shifters. This will lead to relatively poor analog distribution networks including a relative high insertion loss for the Tx signals.

Alternatively, one might share the active RF frontends to several antenna elements, which significantly affects the achieved beam patterns and provides less flexibility in forming and steering of beams.

In a second approach (Approach 2), use is made of low cost RF frontends. Several research groups have tried and are still trying to use low cost RF chains per antenna element. One example includes the active antenna activities mentioned above. Other groups try to reuse the already fully optimized RF frontends from 3 GPP user devices, which seem to be available at costs of about 30 Euros per RF frontend. For a 256 antenna element array this still would incur costs of upwards of 8000 Euros (about 11,000 U.S. dollars).

In a third approach (Approach 3), the functionality of RF frontends is minimized. Massive MIMO entails an overprovisioning of antenna elements compared to the number of served users. This might allow for some form of over-the-air generation of Rx signals by suitable combining of many different Tx signals from different antenna elements.

This opens the possibility for RF chains with limited functionality such as much lower Tx power, limited peak to average power ratios of the PA, low resolution ADCs having only few bits, etc., which will reduce the cost per RF frontend potentially significantly.

An exemplary embodiment uses the lowest functionality per RF chain, i.e., in one case, a simple on-off switching of PAs together with some phase shifting of the RF signal may be used. This can be seen as a 1-bit ADC per PA, but by direct control from the baseband chip any further ADC component might become superfluous (e.g., the baseband chip could approximate the 1-bit ADC output).

One main aspect herein combines these extremely "dumb" RF frontends with a limited set of full performance RF frontends having high linearity, high resolution ADCs, high quality RF filters, high back off, and the like. The dumb RF frontends can be then seen as booster antennas for the high quality RF frontends.

The system works according to a "dirty paper" precoding concept, i.e., the dumb antenna elements generate, by over-the-air combining, a beamformed and precoded signal, which is as close as possible to the intended Rx signals at the currently served users. As is known, dirty paper coding is a technique for efficient transmission of digital data through a channel subjected to some interference known to the transmitter. The technique consists of precoding the data in order to cancel the effect caused by the interference. The high quality RF frontends are being used herein to generate a compensation signal, which generates the finally intended Rx signal at UE side. For a high number of booster antennas, the 'dirty' signal will be already very close to the intended signal so that the power for the compensation signal can be very small. That is, the dumb RF chains provide a signal that is close to what is required and the high quality RF chains compensate the signal provided by the dumb RF chains to generate a signal that is what is required (or closer to what is required).

This exemplary embodiment includes a proper combination of coarse precoding performed by very simple active antenna elements (e.g., the dumb RF frontends) and fine precoding performed by high accuracy RF frontends, in the end providing accurate beamforming.

A second aspect herein concerns the bulky RF filters in conventional RF chains, which are needed to avoid out-of-band spurious transmissions and have therefore extremely high requirements and hinder the intended single chip solutions. To overcome the issue, it is proposed to combine two antenna elements with half, or n times 1/nth, on-off switching rates. Together with a delay of half a time slot, the over-the-air combination of the two Tx-signals will allow the system to form full-rate signals at the receiver. The important benefit is the halved size of the Tx spectrum, which means that filters with much less passband-to-stopband steepness can be used to achieve the required adjacent channel leakage ratio (ACLR), which are much easier to implement and can be probably implemented without ceramic filters. Note that one might call this concept lower-than-Nyquist transmission, opposite from the well-known investigations for faster-than-Nyquist transmissions.

Due to the two different set of antenna elements associated with different sophistication RF-chains (i.e., dumb and full), it is proposed to have two different types of channel estimation concepts for each of these. For example, the limited number and more important full RF-chains might rely on accurate PMI feedback, while for the dumb antenna elements, a simple reciprocity approach might be used (e.g., either from TDD SRS or achieved by a specific extra measurement phase in FDD where the UE transmits SRS in the DL frequency band).

For low to moderate load conditions and depending on the strategy, either only the full RF frontends or only the dumb RF frontends might be active. In the first case, the system is used in a conventional manner, while in the second case of only dumb RF frontends, the idea would be to use inaccurate precoding with corresponding low modulation and coding schemes (MCSs), but with very high power efficiency.

The UEs might be informed about the different Tx techniques, for example, to allow the adaptation of the channel estimation as well as reporting, i.e., the UEs might turn on or off the SRS and/or might stop reporting of PMI feedback.

A further relevant aspect is the front hauling over, e.g., CPRI interfaces. With a massive number of antenna elements, the CPRI data rate would explode. In addition, for the dumb RF chains, one to a few bits per antenna element might be sufficient and will have a different meaning compared to the conventional quantized baseband signals (e.g., phase offset+ PA on-off). For that reason, it is possible to propose a redefinition of the CPRI interface for the instant massive MIMO arrays. This can take into account as well that the dumb elements (e.g., dumb RF chains) use half rate while the full RF chains still run at full rate.

Figure 1B:
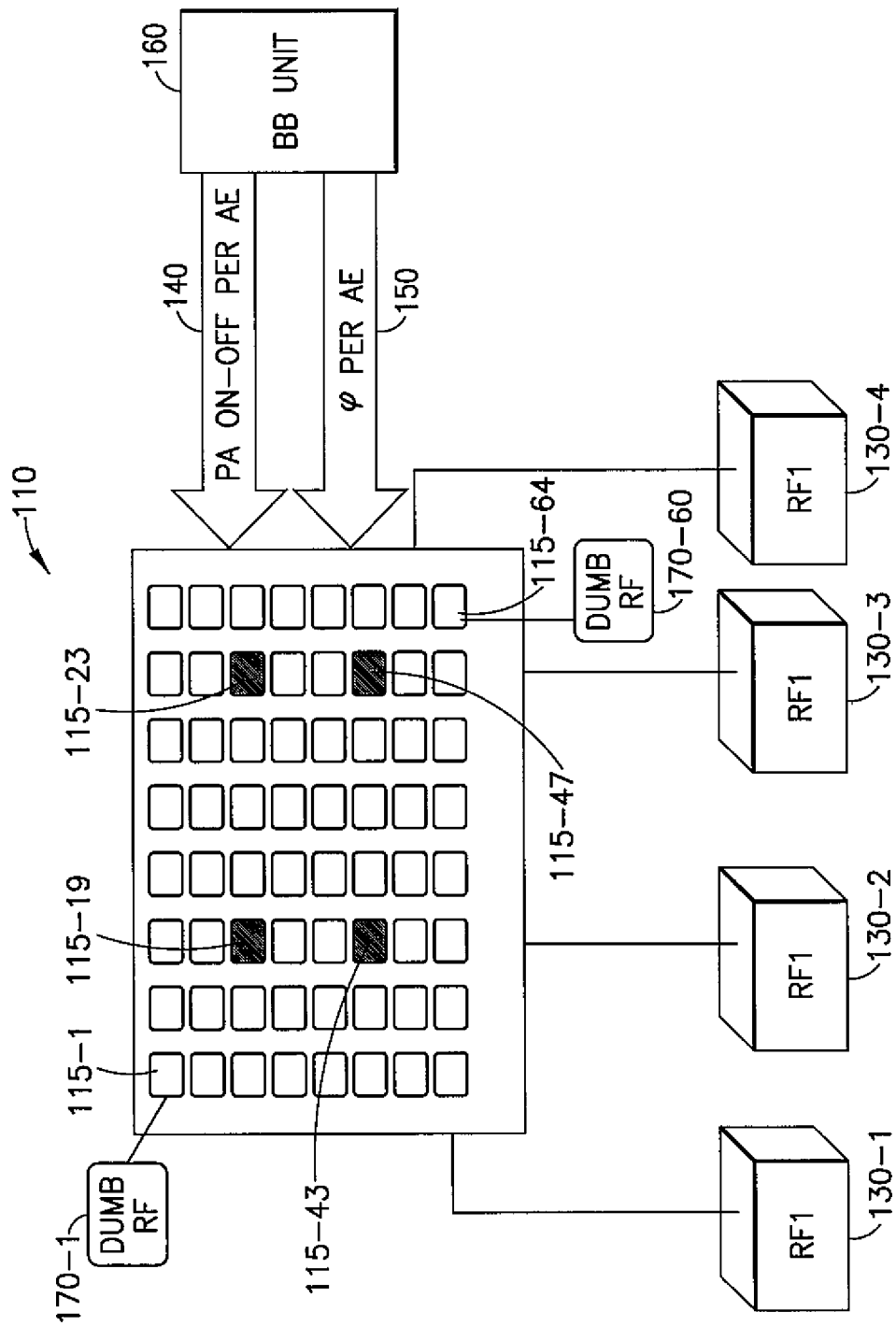

For a better understanding of the exemplary embodiments, see FIG. 1, including FIGS. 1A and 1B. FIG. 1A shows an antenna array 110 and two possible beams 120-1 and 120-2 that might be produced by the antenna array 110 to transmit data to two UEs. The beams 120-1 and 120-2 would be used at the same time for MU-MIMO. As illustrated by FIG. 1B, there are 64 antenna elements (AEs) 115-1 through 115-64 (i.e., an 8×8 array of antennas in this example). Herein, the antenna elements 115 are also referred to as antennas (e.g., each antenna element is an antenna), and any antenna configuration for such antenna elements 115 may be used. FIG. 1B also shows four full high quality RF chains 130-1 through 130-4 that are combined with a high number (60 in this example) of dumb RF booster chains 170-1 through 170-60. The high quality RF chains 130-1 through 130-4 are connected to the AEs 115-19, 115-23, 114-43, and 115-47 in this example. Each of these AEs 115-19, 115-23, 114-43, and 115-47 is steered by a full RF chain 130. The dumb RF booster chains 170-1 through 170-60 are connected to all other antenna elements (e.g., 115-1 through 115-18, 115-20 to 115-22, 115-24 to 115-42, 115-44 to 115-46, and 115-48 to 115-64), one dumb RF booster chain 170 per AE 115. The baseband (BB) unit 160 controls the dumb RF booster chains 170-1 through 170-60 using the signals PA on-off per AE 140 and phase (($\phi$)) per AE 150. That is, these AE are controlled with simple on-off PA and phase.

Figure 2A:
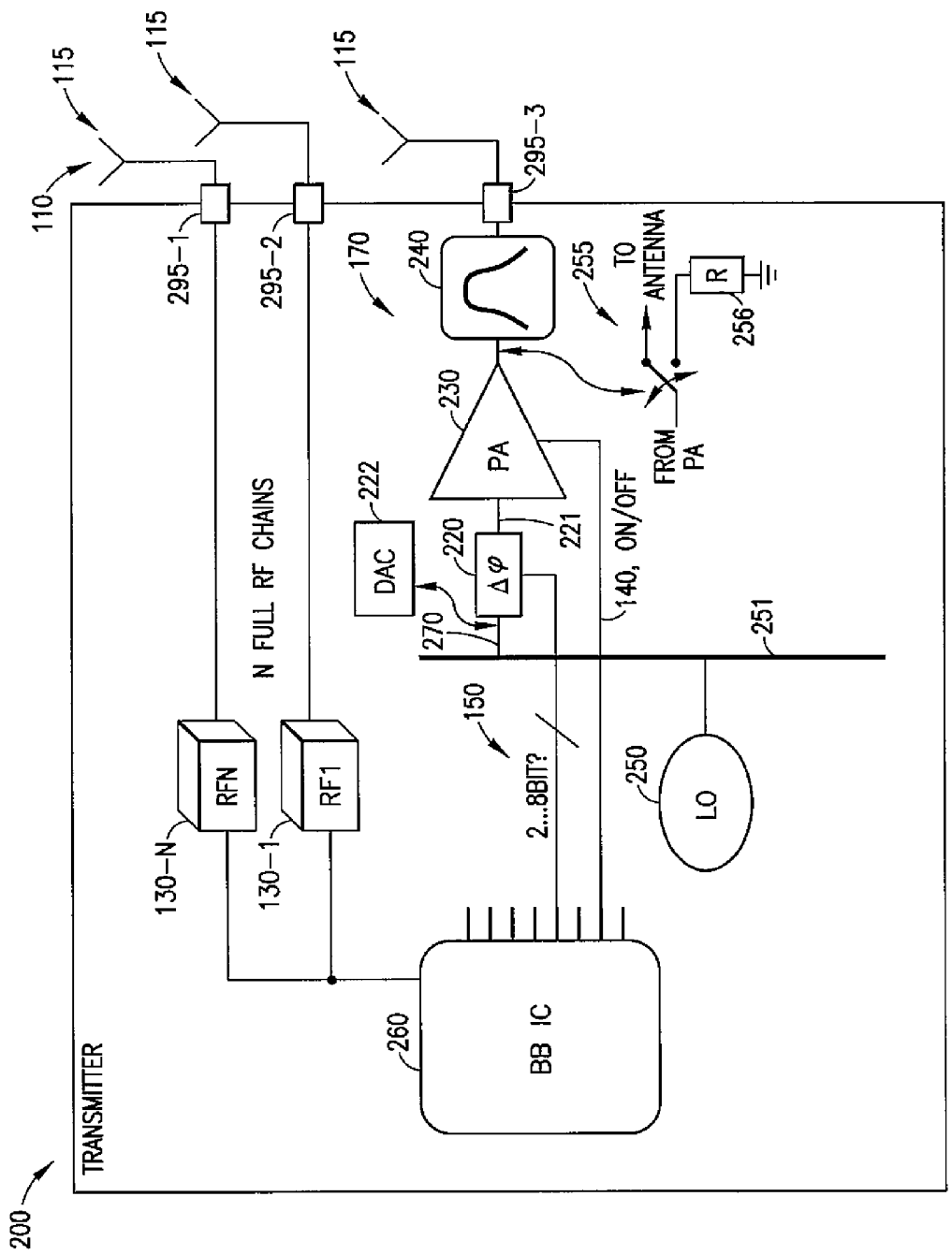
FIGS. 2A and 2B, illustrates a transmitter comprising a proposal combining possible very slim, low cost RF-chains that avoid ADCs, have constant amplitude PAs and simple RF filters due to, e.g., half-rate switching and conventional RF frontends.
Figure 2B:
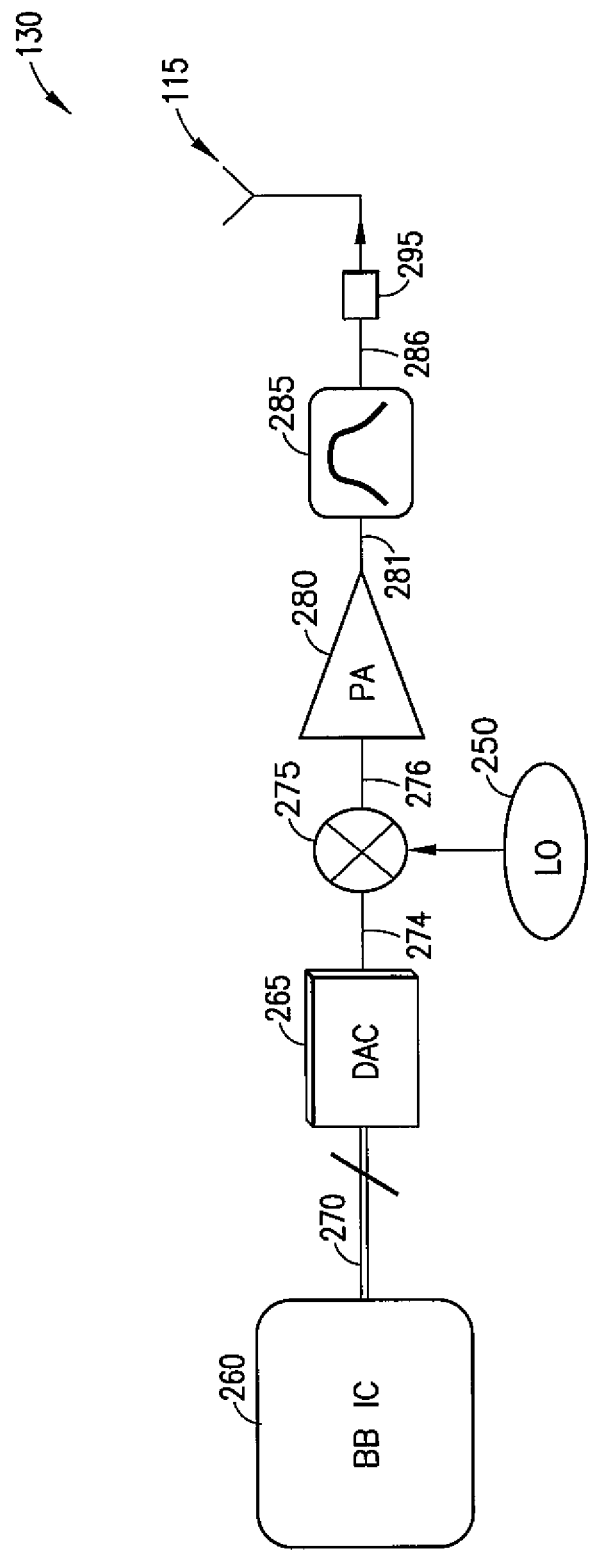

Turning to FIG. 2, including FIGS. 2A and 2B, this figure illustrates a transmitter 200 comprising a proposal combining possible very slim, low cost RF-chains that avoid ADCs, have constant amplitude PAs and simple RF filters due to, e.g., half-rate switching and conventional RF frontends. In FIG. 2 an exemplary dumb RF chain 170 is illustrated in more detail. The dumb RF chain 170 contains a phase shifter 220 (which receives a baseband signal 270 and applies a phase shift to the baseband signal to create a phase-shifted signal 221) and a switchable power amplifier (PA) 230, which has two states: one state causes the PS 230 to be silent (i.e., no power output), and the other state causes the PS 230 to transmit with full power. The input of the PA 230 is the phase-shifted signal 221 from phase shifter 220, which uses an input from the local oscillator (LO), and for which the phase can be shifted by a limited number of integer steps, possibly 2 to 8 bits of integer steps (=4 to 64). The PA 230 is followed by a simple RF filter 240, which accepts as input an amplified signal and produces a filtered signal. The control signals (e.g., for the phase shifter 220, PA 230, might be generated, e.g., from the baseband chip (BB IC 260) directly and provide one control signal 140 for the PA 230 and potentially a bus signal 150 (from two to eight bits in this example) for the phase shifter 220. In the example of FIG. 2A, there are a number of RF couplers 295-1, 295-2, and 295-3 that allow the transmitted to be coupled to (or decoupled from) the antennas 115 and the antenna array 110. The output of the LO 250 is distributed to the dumb RF booster chain 130 and other elements via the distribution network 251.

In the example of FIG. 2A, the dumb RF booster chains 170 have no analog-to-digital converter (DAC), as an "analog on/off=digital" signal is produced by the BB IC 260. However, as illustrated by reference 222, a "simple" DAC may be used (e.g., such as a single-bit or few bit DAC). Note that different locations for the DAC or configurations are possible. The DAC may replace the phase shifter as is the case for a normal RF chains or the phase shifter and the DAC can be configured to work together so that the DAC defines the amplitude and the phase shifter the phase.

In this example, if there are M AEs 115, and N full RF chains 130, then there would be M-N dumb RE chains 170, of which only one is shown in FIG. 2. An example could be there are 256 AEs 115.

It is noted that a single BB IC 260 is shown in FIG. 2A. If possible, one would try to use one single BB chip for all RF chains 130, 170, although it is possible to use more than one BB IC 260. It is further noted that the number of full RF chains 130 is related to the number of simultaneously served UEs (or more accurately served spatial streams). Typically, the number of full RF chains 130 should be number of streams plus one (or plus more than one, as more than one provides better diversity, but a diversity of one provides already the most important diversity gain).

FIG. 2B illustrates a full RF chain 130 shown in FIG. 2A. The full RF chain 130 in FIG. 2B comprises a DAC 265, which accepts 12 to 16 bits from the BB IC 260 via a bus 270 that carries a digital baseband signal, and the DAC is a broadband DAC, meaning the DAC has a high bandwidth. The DAC 265 outputs an analog signal 274 to a multiplier 275, which also has an input from the LO 250, and which creates an RF output 276. The PA 280 accepts the output 276 and amplifies the RF output 276 to create an amplified RF signal 281. The amplified RF signal 281 is filtered by the filter 285 and the resultant filtered signal 286 is configured to be coupled to the antenna 155 (and in this example is coupled to the antenna 115) via the RF coupler 295. The PA 280 has the following exemplary features: ability to amplify from 30 to 46 dBm; frequency range of two to three GHz; a highly linear transfer function; large headroom; and optimized PAE. The filter 285 is a filter with excellent features such as the following: low insertion loss; large stop band attenuation; steep filter slopes; and the like. Thus, the full RF chains 130 provide a certain functionality.

As a consequence, the full RF chains 130 provide excellent RF performance, but they are expensive due to features such as high end components, they have relatively high power consumption due to the features of PA headroom, linearity, broadband high-bit ADCs, and the like, and they are bulky due to the features of a number of components, size of mechanical filters, control circuitry, and the like. The main benefit of a full RF chain 130 is that the chain allows transmission of any desired BB signal with a high RF quality, which allows for optimum precoding/beamforming over different RF chains close to a theoretical optimum.

Meanwhile, the dumb RF chains 170 have, at least in one aspect, a reduced functionality compared to a full RF chain 130, which more or less transfers the BB signal to the RF-band with minimum to no degradations. In particular, the dumb RF chains 170 relax at least one feature of a full RF chain 130. For instance, the dumb RF chains 170 relax quality of parts, such as using instead low cost part or even completely omitting components, e.g., no ADC, having a simple PA with low Tx power (e.g., <20 dBm), and the like. Furthermore, the above features of PA headroom, linearity, broadband high-bit ADCs, or any other feature described relative to the full RF chain 130 or not described but implemented by the full RF chain 130 may be relaxed. To "relax" a feature means that a requirement for that feature is not met. For example, if a feature is Tx power a feature of which for the PA 280 is up to 46 dBm for a full RF chain 130, a relaxed feature would be less than 46 dBm (e.g., less than 20 dBm). A target for the dumb RF chains 170 is a single chip—or system on chip—per AE. A result is reduced beamforming/precoding capabilities for the dumb RF chains 170, relative to the full RF chains 130.

The antenna elements 115 may be the same for the dumb RF chains 170 and the full RF chains 130. However, the dumb RF chains 170 might also use different type of antennas than used by the full RF chains 130. For example, the dumb RF chains 170 might use more narrow band antennas compared to antennas used by the full RF chains 170. This would be an extension from the RF to the antennas. That is, the characteristics of the antennas used by the dumb RF chains 170 and the full RF chains 130 could be different, and such different characteristics include narrow band (e.g., for the dumb RF chains) versus wide-band (e.g., for the full RF chains).

Figure 3:
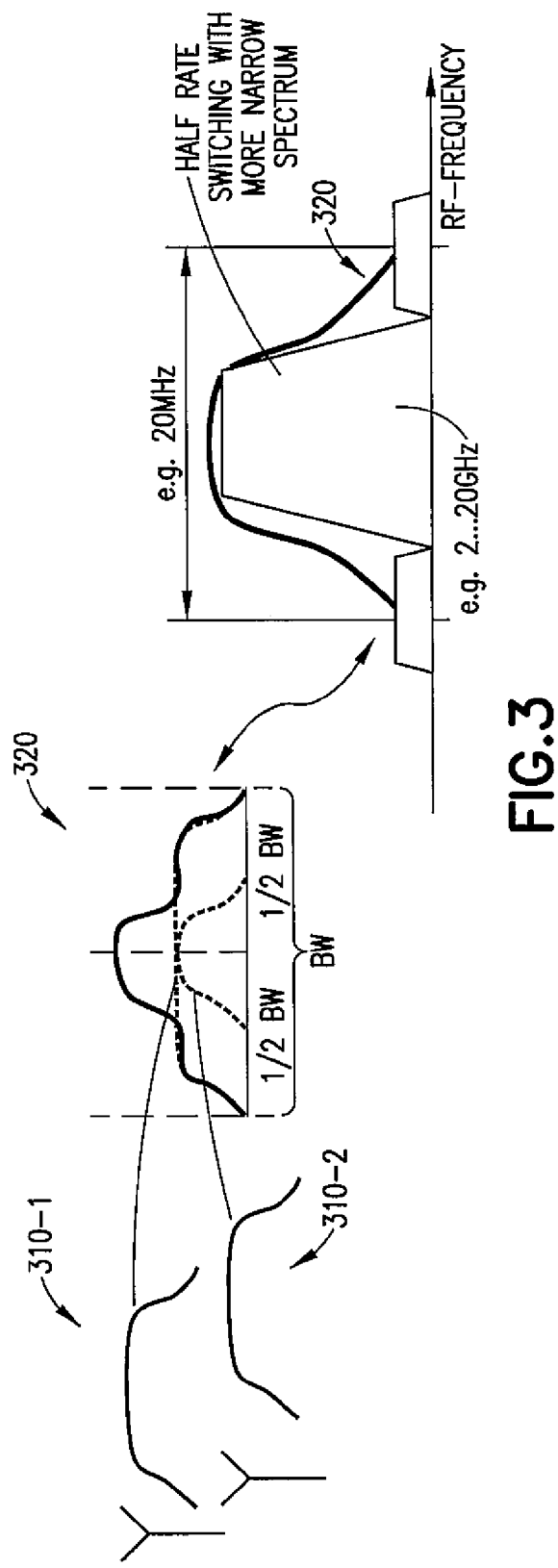
FIG. 3 illustrates over-the-air combining of half rate switched signals from at least two antennas and the corresponding narrowed spectrum allowing for low cost compact size RF filters.

As can be seen from FIG. 3, which illustrates over-the-air combining of half rate switched signals from at least two antennas and the corresponding narrowed spectrum allowing for low cost compact size RF filters, the control signals for the PA 230 and the phase shifter 220 run with half rate. The term half rate means with half the rate of the "full rate" sampling frequency of the baseband signal, being, e.g., for LTE 0.5 times 1/33 ns=15 MHz being half the rate of conventional LTE of 30.72 MHz. In FIG. 3, the signals 310-1 and 310-2 are created by half-rate switched signals, such that the PA 230 could be switched on and off at half the rate of the sampling frequency of the baseband signal or any change in phase or amplitude is performed with the half rate, and therefore the signals 310-1 and 310-2 have half the total bandwidth, BW, or ½ BW. It is noted that the dumb RF chains 170 may run simply at less than the full rate or run lower than the half rate. That is, half rate is only one option. Furthermore, allowing only pairs of RF frontends to perform less-than-full-rate operation is an option, but more than two RF frontends could be used. Basically the switching time instant is delayed, but not the radio frequency chains as such. Delay by half a time slot is a baseline concept. In case of rates other than half rate, this delay would have to be adapted as well. The signals 310-1 and 310-2 are combined via over-the-air combination to create a resultant signal 320. Note that there is an appropriate phase difference between the timing of the two half-rate signals used to determine signals 310-1 and 310-2 in order to have the two signals 310-1 and 310-2 add appropriately. The idea is that one RF chain changes its signal at a first time instant and the second RF chain at a suitably time-shifted instant (one time slot of the full rate signal). For instance, in the example of FIG. 3, the first time instant is about half the time slot (one RF chain turns on at the beginning of the time slot and turns off at the half way point in the time slot, while the second RF chain turns on at the half way point in the time slot, and turns off at the end of the time slot). For three RF chains, the signals would be changed at the beginning of a time slot and at one and two thirds of a time slot. Furthermore, half rate means that both RF chains have a spectrum of half the bandwidth, e.g., 10 MHz instead of 20 MHz, but both will stay at the center of the RF band. In this example, the resultant signal 320 may be centered between 2 and 20 GHz.

Instead of switching the PA 230 on and off, one might consider switching between the antenna and a dumb resistor element to improve switching quality. For instance, in FIG. 2A, a switch 255 is shown that would connect the output of the PA 230 to the filter 240 (and to the antenna 115) half the time and connect the output of the PA 230 to the resistor 256 (which has an output to ground) half the time. Note that the switch 255 may instead be at the output of the filter 240. The switching rate is the half-rate described above. Due to the very high PAE together with the very low Tx power due to massive MIMO, the overall power consumption will remain small. Generally, it means that here a time domain approach for the signal generation is being proposed, where the Rx signals are generated sample-by-sample by according over-the-air signal generation of superposed signals. It should be noted that the full RF chains 130 may also use a similar switching between the antenna and a dumb resistor element in order to create a full-rate signal.

It is further noted that "over-the-air combining" means that all individual signals from the different antenna elements of a massive MIMO array are being superposed at the UE receiver's antennas due to the linearity of the radio channel. In case of a massive MIMO array with many individual antenna elements, one can generate quite complex Rx signals with very limited signal options at a single antenna element (one way to look at this would be to call this a distributed DAC).

In the following, some exemplary and non-limiting implementation aspects are mentioned.

Novel channel estimation concepts may be needed to allow for independent estimation of the high quality and the very simple dumb antenna elements. For example, for frequency division duplex (FDD), several dumb antenna elements might be combined for transmitting common virtual CSI-RSs. As another example, FDD might be combined with the transmission of specific SRS from UEs on the DL frequency band. That way, channel reciprocity can be exploited also for FDD allowing the CSI estimation of many dumb antenna elements simultaneously.

UEs should be aware that they are being served by a massive MIMO array combining dumb with high quality RF chains, and therefore they might benefit by explicit accurate reporting for the high quality antenna elements and simplified reporting for the dumb antenna elements. This is also needed as the dumb antenna elements will have to send specific CSI RSs which can be generated by on-off only PAs.

There might be different types of dumb RF chains. For example, power on/off of the RF-frequency might be interesting as this leads to very high power amplifier efficiency (PAE) of ideally 3 dB with simultaneously a very simple PA configuration, which helps to minimize heating issues. As an extension, one might consider tri-state control signals per PA, which has then three states like +1, −1 and high impedance (0). This might enable also three values for the Tx power without the need for an ADC converter. The number of states required for the phase offsets for full beamforming flexibility is for further study and might be between fixed phase, four phase offsets or digitally controlled by, e.g., two to eight bits.

For beamforming, one might form as alternative groups of antenna elements with predefined phase offsets (such that a grid of beam, GoB, concept may be included) being switched simultaneously. This might reduce the number of required bits for the phase offset control and might be easier implemented by fixed delay lines.

The PA 230 on/off switching might be accompanied by a common slow per subframe power adjustment for all PAs simultaneously with the goal being to optimize the precoding accuracy.

The concept relies a lot on fast switching elements and fortunately low cost and high performance GaAs SPDT switches with 3 GHz RF bandwidth, $t_{on}$, $t_{off}$=10 ns switching time and 0.3 dB insertion loss on a 2×2 mm² chip for a price of about thirty cents are already available (for example AS 179-92LF, which is a GaAs IC SPDT switch with a frequency range of 0.02-3 GHz manufactured by Skyworks Inc.).

Figure 4:
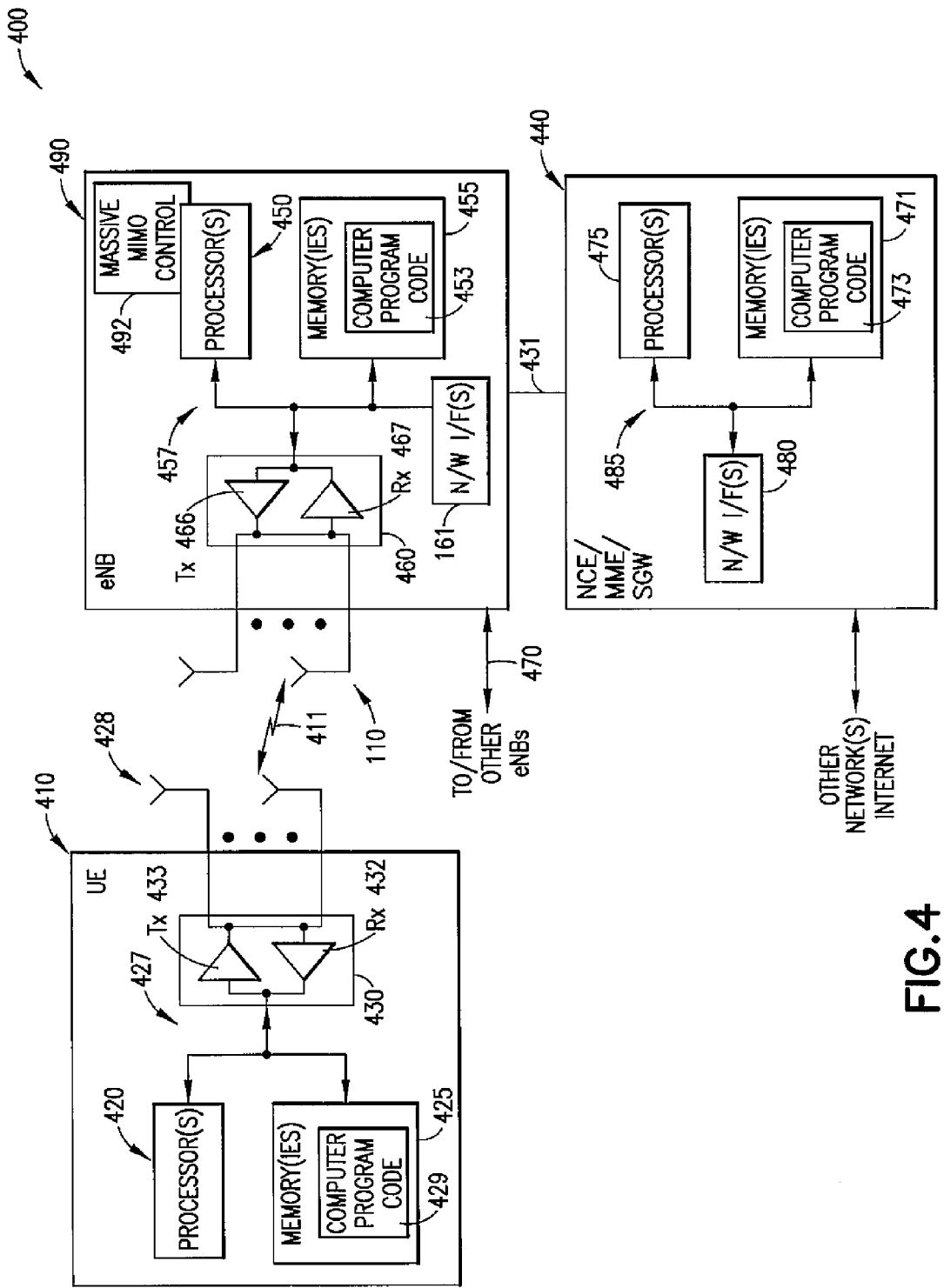
FIG. 4 illustrates a system in which the exemplary embodiments may be practiced.

Reference is made to FIG. 4, which shows a block diagram of an exemplary system in which the exemplary embodiments may be practiced. In FIG. 4, user equipment (UE) 410 is in wireless communication with a network 400 via a wireless link 411. The user equipment 410 includes one or more processors 420, one or more memories 425, and one or more transceivers 430 (each comprising a receiver, Rx, 432, and a transmitter, Tx, 433) interconnected through one or more buses 427. The one or more transceivers 430 are connected to one or more antennas 428. The one or more memories 425 include computer program code 429.

The eNB 490, which is a base station providing wireless access by the UE 410 to the network 400, includes one or more processors 450, one or more memories 455, one or more network interfaces (N/W I/F(s)) 461, and one or more transceivers 460 (each comprising a receiver, Rx, 467 and a transmitter, Tx, 466) interconnected through one or more buses 457. The transmitter 466 can be or implement the transmitter 200 of FIG. 2A. The one or more transceivers 460 are connected to an antenna array 110. The one or more memories 455 include computer program code 453. In this example, there is a massive MIMO control module 492 that is part of the eNB 490 and that causes the eNB 490 to perform one or more of the operations herein. In an example, the massive MIMO control module is formed (e.g., completely or in part) using the computer program code 453. That is, the computer program code 453 in the one or more memories 455 in an example may operate to control the eNB 490, such that the one or more memories 455 and the computer program code 453 are configured, with the one or more processors 450, to cause the eNB 490 to perform one or more of the techniques described herein. In another example, the massive MIMO control module 492 may be implemented (e.g., completely or in part) in hardware elements, such as an application-specific integrated circuit, or a field-programmable gate array.

The one or more network interfaces 461 communicate over one or more networks such as the networks 470 and 431. Two or more eNBs 490 communicate using, e.g., network 470. The network 470 may be wired or wireless or both and may implement, e.g., an X2 interface.

The wireless network 400 may include a network control element (NCE) 440 that may include Mobility Management Entity (MME) or Serving GateWay (SGW) functionality, and which provides connectivity with a further network, such as a telephone network and/or a data communications network (e.g., the Internet). The eNB 490 is coupled via a network 431 to the NCE 440. The network 431 may be implemented as, e.g., an S1 interface. The NCE 440 includes one or more processors 475, one or more memories 471, and one or more network interfaces (N/W I/F(s)) 480, interconnected through one or more buses 485. The one or more memories 471 include computer program code 473.

The computer readable memories 425, 455, and 471 may be of any type suitable to the local technical environment and may be implemented using any suitable data storage technology, such as semiconductor based memory devices, flash memory, magnetic memory devices and systems, optical memory devices and systems, fixed memory and removable memory. The processors 420, 450, and 475 may be of any type suitable to the local technical environment, and may include one or more of general purpose computers, special purpose computers, microprocessors, digital signal processors (DSPs) and processors based on a multi-core processor architecture, as non-limiting examples.

Figure 5:
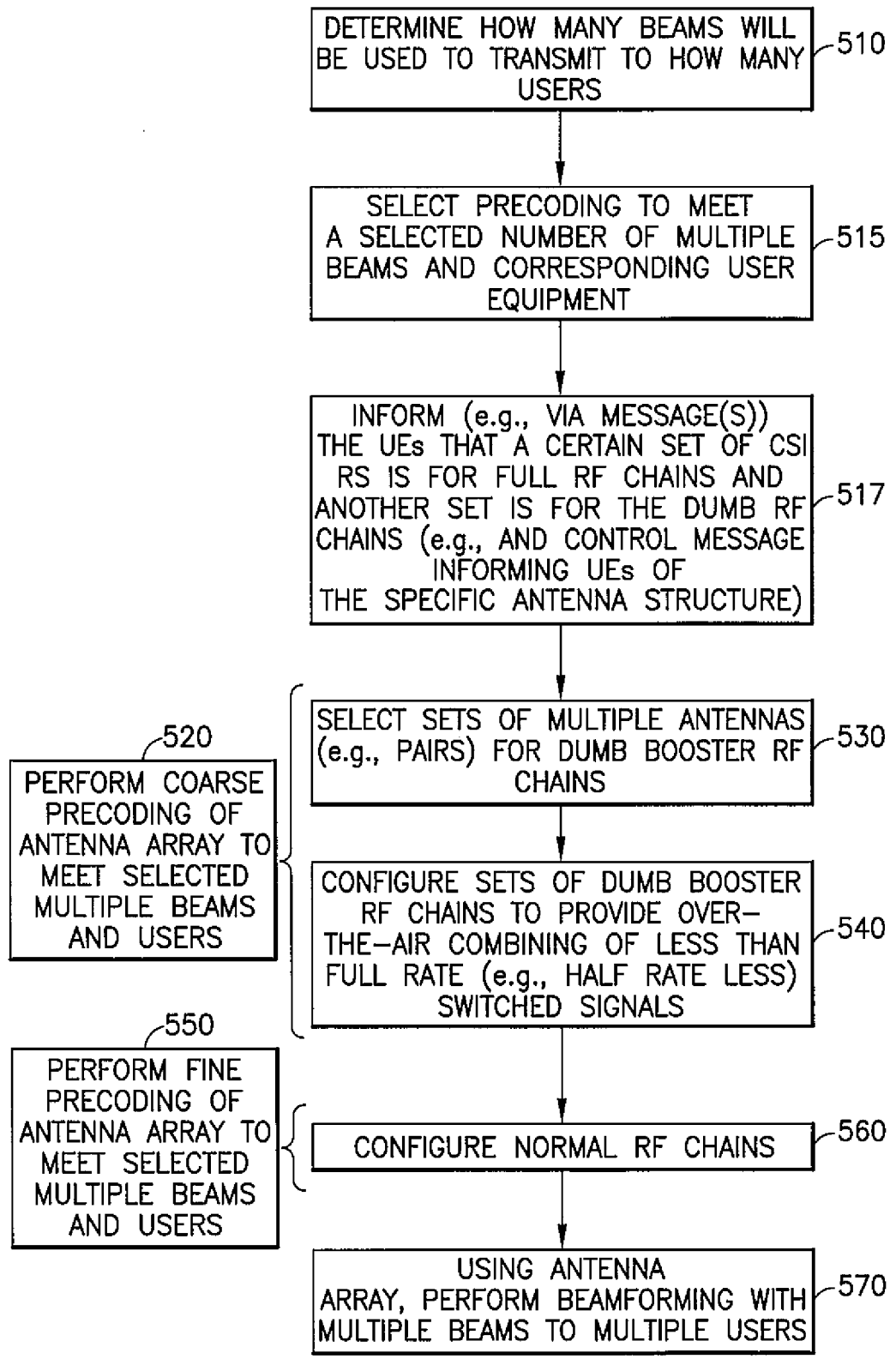
FIG. 5 is a block diagram of an exemplary logic flow diagram for use of low effort massive MIMO antenna arrays, and that illustrates the operation of an exemplary method, a result of execution of computer program instructions embodied on a computer readable memory, and/or functions performed by logic implemented in hardware, in accordance with exemplary embodiments herein.

Turning to FIG. 5, a block diagram is shown of an exemplary logic flow diagram for use of low effort massive MIMO antenna arrays. This figure also illustrates the operation of an exemplary method, a result of execution of computer program instructions embodied on a computer readable memory, and/or functions performed by logic implemented in hardware, in accordance with exemplary embodiments herein. The blocks in FIG. 5 may be performed by the eNB 490, e.g., under control of the massive MIMO control module 492. The block sin FIG. 5 may also be considered to be interconnected means for performing the functions in the blocks.

In block 510, the eNB 490 determines how many beams will be used to transmit to how many users. In block 515, the eNB 490 selects precoding to meet the selected number of multiple beams and user equipment. In block 517, the eNB 490 informs (e.g., via message(s)) the UEs 410 that a certain set of CSI (e.g., CSI RS or other reference signal for, e.g., reporting channel quality) is for full RF chains and another set of CSI (e.g., CSI RS or other reference signal for, e.g., reporting channel quality) is for the dumb RF chains. This way, the UEs can select appropriate feedback, as described above. Typically, different CSI reference signals would be used for dumb and full RF chains and also there would be different corresponding feedback. Furthermore, a control message informing the UEs about the specific antenna structure may also be sent.

In block 520, the eNB 490 performs coarse precoding of the antenna array 110 to meet the selected multiple beams and users (e.g., where a "user" typically means a user equipment 410). This precoding is generally vendor specific, but the dumb RF chains 130 have some restrictions in their precoding solutions. So one way for calculation of the dumb precoder is assuming perfect RF chains plus applying any restrictions (for example two amplitude values only) to the optimum precoder signal. As a result, the UEs 410 receive a signal that has errors, which is known by the eNB 490. Blocks 530 and 540 are examples of a portion of block 520. In block 530, the eNB 490 selects sets of multiple antennas 110 for dumb booster RF chains 170. Selecting pairs of antennas is described above (e.g., see FIG. 3), but multiple antennas may also be selected in a set. The number of antennas defines the degrees of freedom, but the generation of beams is performed by all antenna elements simultaneously. Each UE gets, e.g., one beam formed from all antennas. Due to linearity, all beams for all UEs can than just be superpositioned (note, that is standard MU MIMO transmission). In block 540, the eNB 490 configures the sets of multiple dumb booster RF chains to provide over-the-air combining of less than full rate (e.g., half rate or less) switched signals, e.g., on a per-UE/per beam basis (assuming one beam per UE). It should be noted that this over-the-air combining can be generalized to all antennas. Note that configuration of pairs of dumb RF chains for half-rate switching can be seen as a baseline approach, but this concept can be generalized so that all of the dumb antennas cooperate, but each of the dumb RF chains has a maximum switching rate of one-half the normal rate (in an exemplary embodiment). That way, the flexibility for signal generation is maximized In block 550, the eNB 490 performs fine precoding of the antenna array 110 to meet selected multiple beams and users. With the fine precoding, just the delta signal has to be sent to get the intended error free signal. As part of claim 550, the eNB 490 configures normal RF chains 130 (block 560), e.g., to compensate for the coarse precoding of the dumb booster RF chains 170. With respect to the full RF chains there is nothing to configure (other than normal configuration). For instance, while the dumb RF chains are configured to cooperate, the full RE chains are independent. As stated above, the antenna array 110 has a certain number of full RF chains driving certain antenna elements and that defines more or less how many independent beams can be formed with good quality. An exemplary idea is to have one more full RF chain than the planned number of beams so that there is at least diversity order of 1 (one) and the full RF chains can compensate the signals for all UEs. If there is really a high number of dumb antenna elements, one might serve in certain scenarios even more streams (e.g., UEs) than number of full RF chains, probably then with some performance degradation for some of the UEs. In block 570, the eNB 490, using the antenna array 110, performs beamforming with multiple beams to multiple users.

Figure 6B:
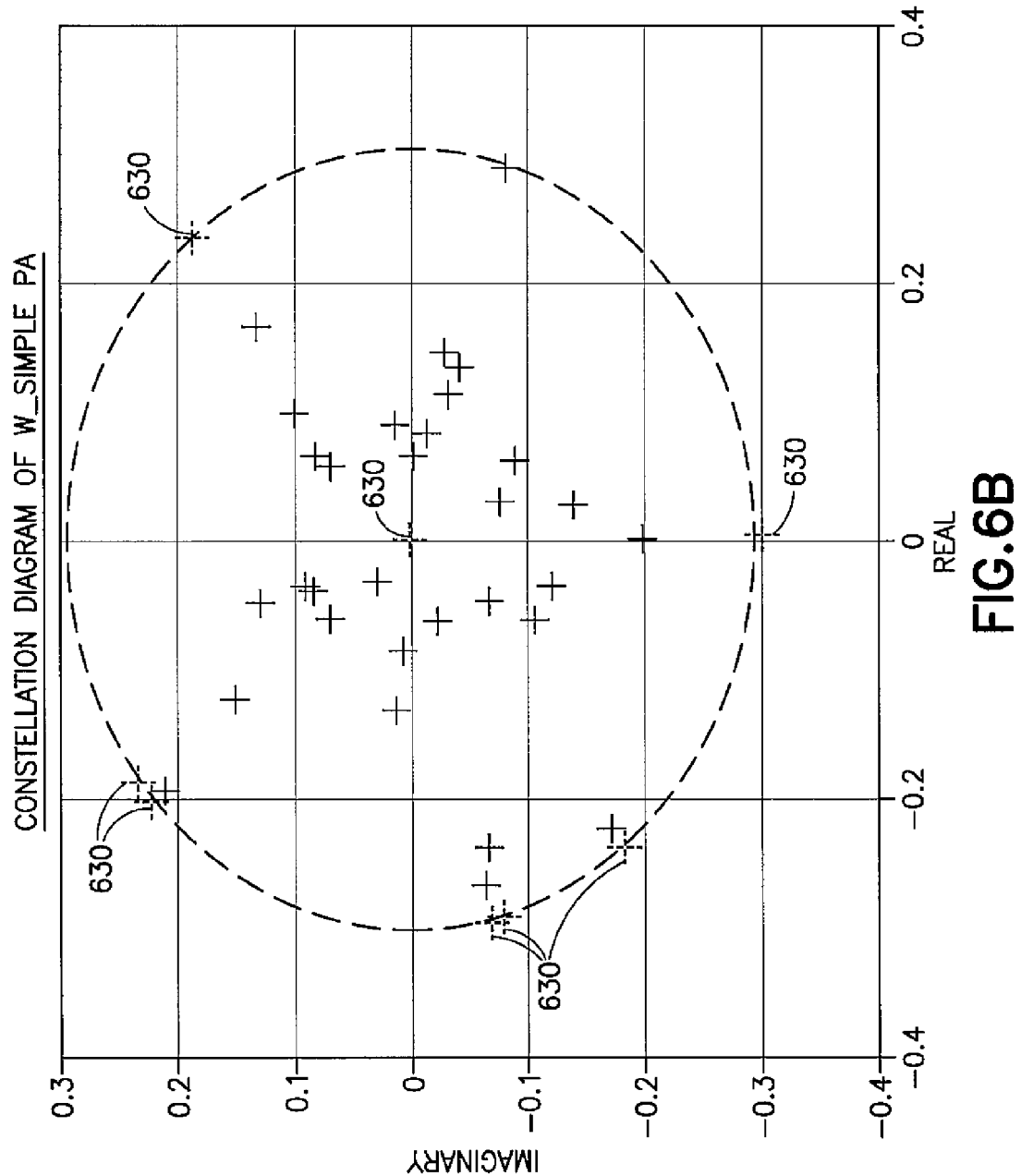
Figure 7A:
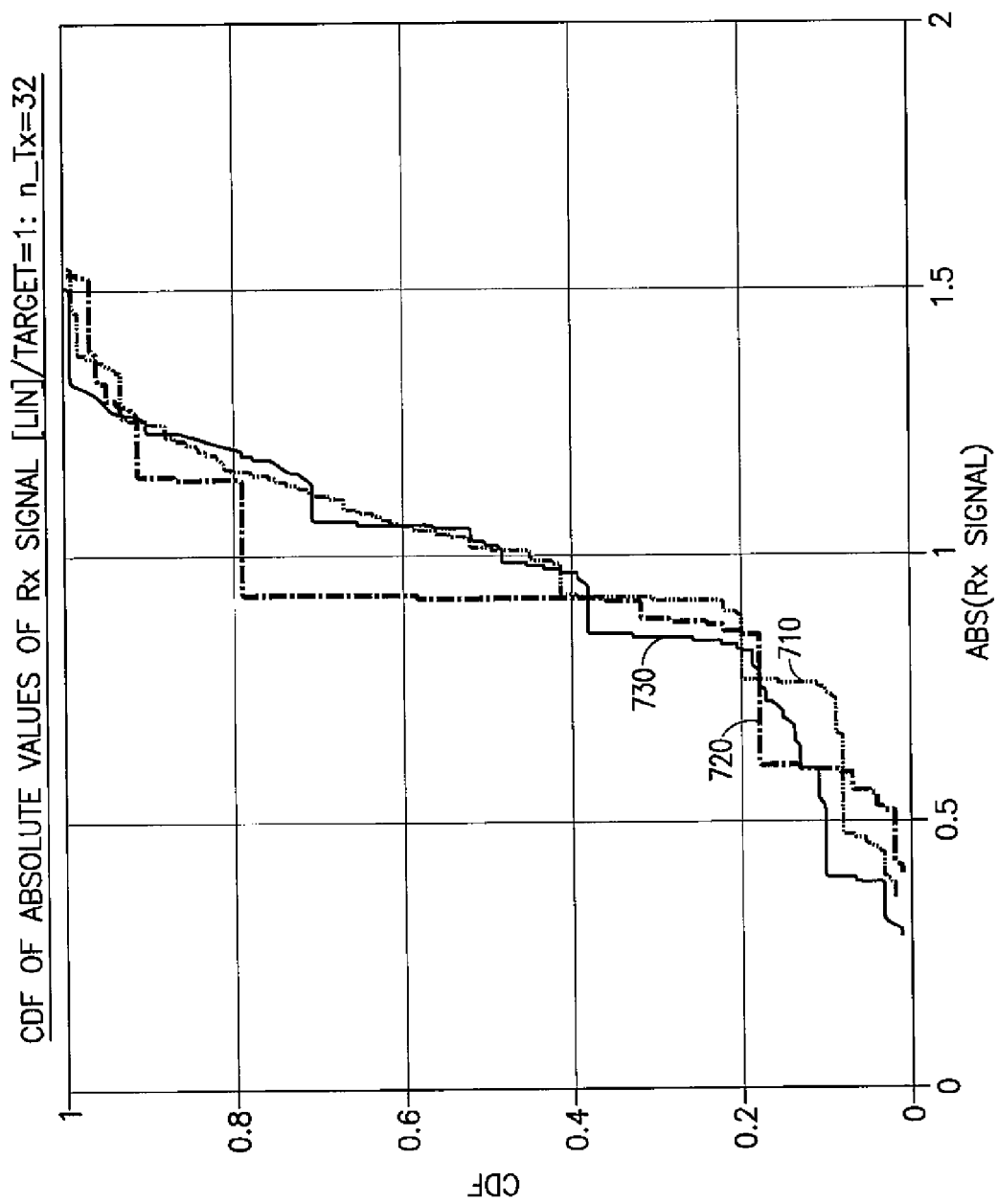
Figure 8A:
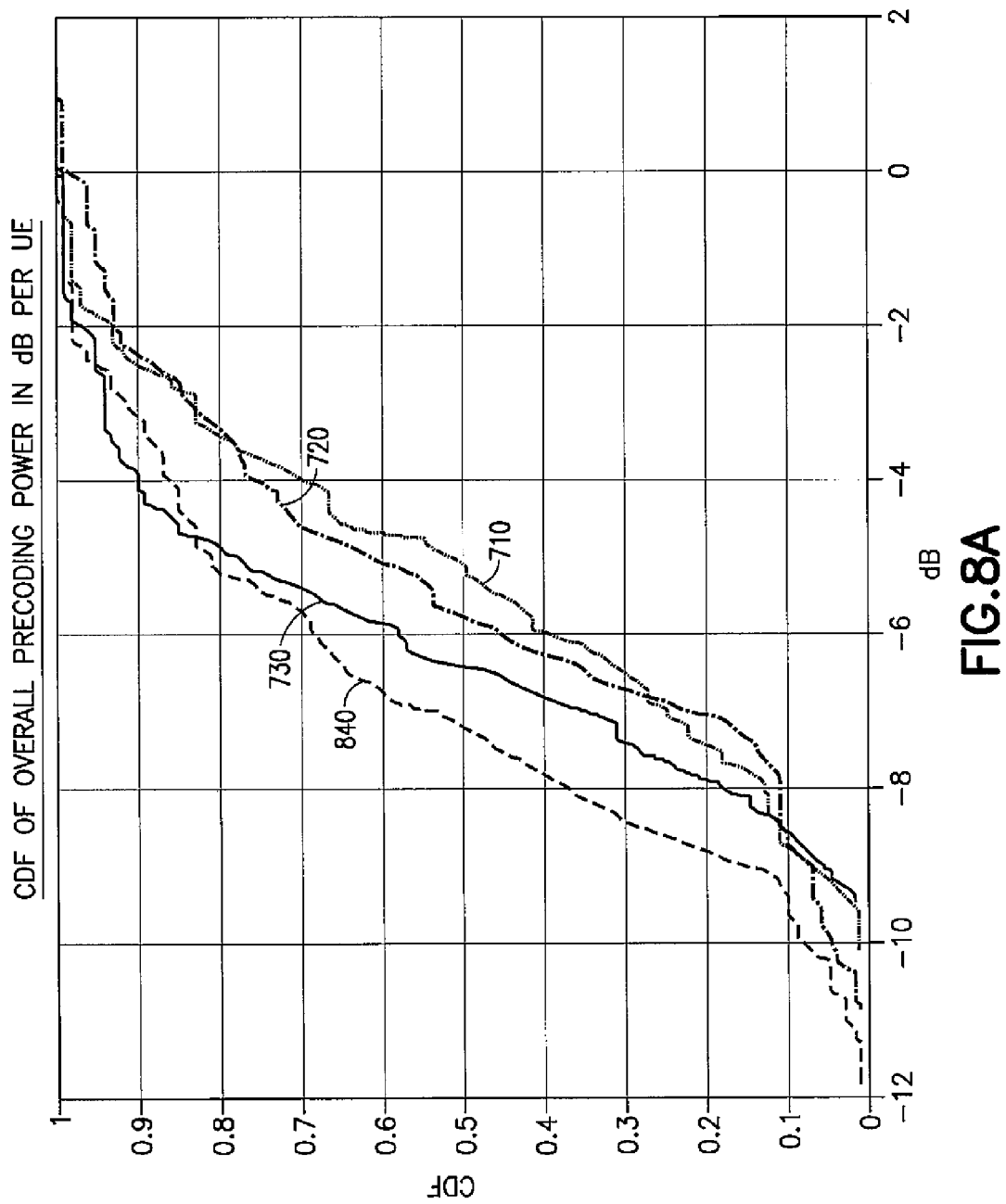
FIGS. 8A and 8B, illustrates in FIG. 8A a CDF of precoding powers for perfect precoding for UEs one through three and precoding power per UE for simple PA solution and in FIG. 8B a curve includes the overall Tx power required with conventional 4×3 precoding (e.g., four antennas and three UEs).
Figure 8B:
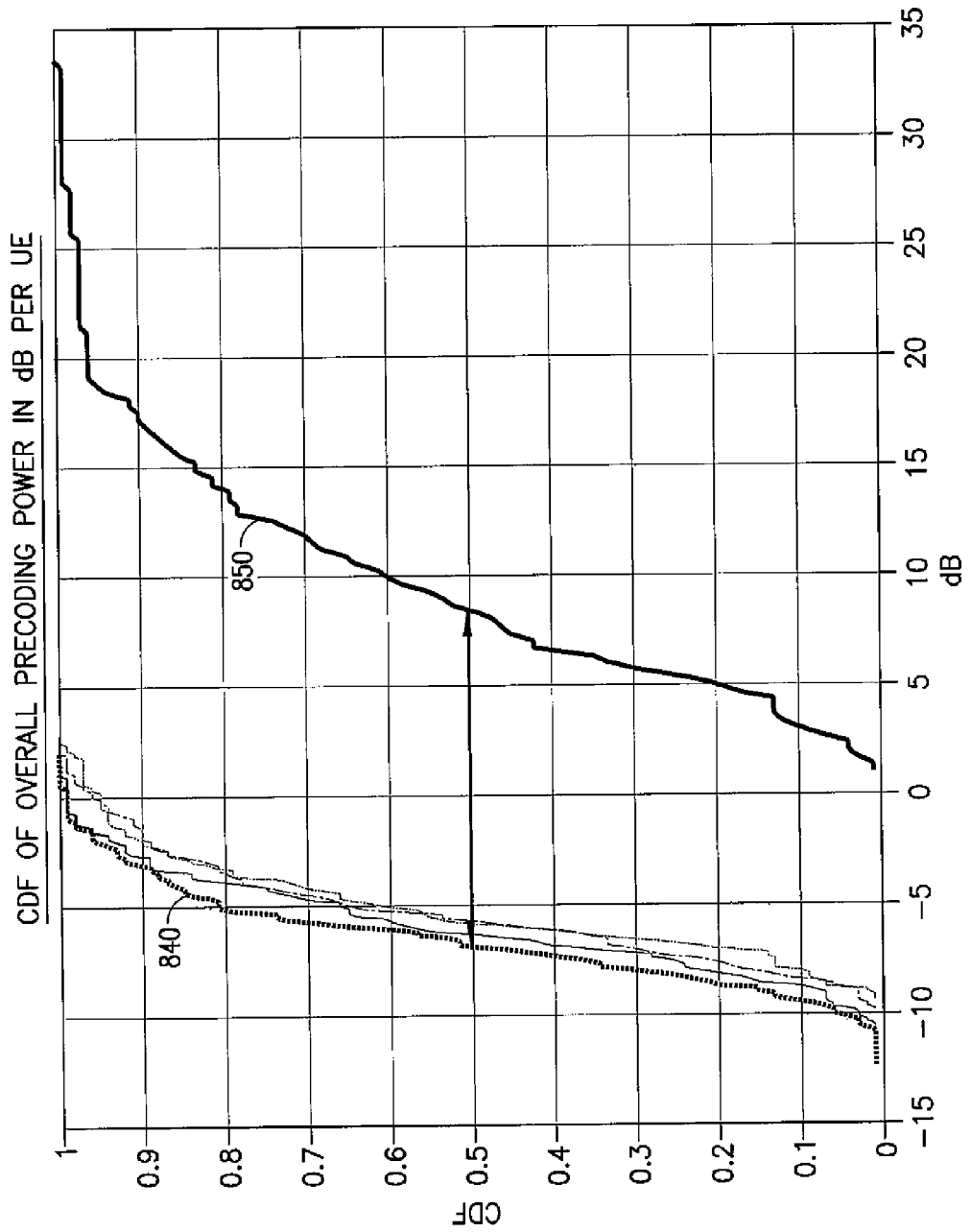

FIGS. 6 to 8 illustrate some simulation results for an exemplary proposed concept. In FIG. 6A, the line 610 indicates the Tx power for a 32 element uniform linear antenna array (ULA) serving three randomly placed UEs in a typical wide area cell. The simulation is based on the Quadriga (QUAsi Deterministic Radio channel GenerAtor) channel model, which itself is based on the Winner and SCMe (3GPP spatial channel model extension) channel models. The power on/off decision for each antenna element is here just the result of a round procedure indicated by the line 620. In FIG. 6B, the correct and rounded precoding values per antenna element are plotted as a constellation diagram. Reference 630 corresponds to line 610, and the other points in FIG. 6B correspond to line 620. Note the colors for the rounded and ideally precoded weights have changed with respect to the figure in FIG. 6A. The rounded weights 630 now have either a fixed amplitude and varying phase or are zero power, while the ideal weights (unmarked in FIG. 6B) change in power as well as phase.

In FIG. 7, the CDF of the simulated signal amplitude and phase at the receiver of the UEs 710, 720, 720 is being plotted for the three served users. Target amplitude and phase has been one (1) and 0° (zero degrees) and from the CDFs it is clear that most realizations (here 100, random UE placements and channel realization have been analyzed) are close to the target values. As a result, the Tx power for the compensation signal generated by the four high quality RF frontends for the three UEs is quite low. Four RF frontends are being used to keep one spatial degree of freedom for diversity, leading to a better condition of the channel matrix and accordingly to a lower precoding power. The line 840 in FIG. 8 is the overall sum power for serving the three UEs, while the line 850 is that for serving the same UEs without any booster antennas only by the four high quality RF chains. Significant power savings of about 15 dB for the average Tx power can be observed, verifying the great potential for the exemplary proposed concept.

Exemplary embodiments have one or more of the following non-limiting benefits and technical effects:
  Very low cost booster RF chain implementation is proposed, thereby reducing the RF chains to single per-antenna-element chip solutions.
  In combination with the high quality RF chains, accurate precoding with full beamforming flexibility is possible. This allows leveraging all known gains from massive MIMO arrays such as beamforming gains, directivity gains leading to reduced interference, improved condition of the channel matrix with according lower required precoding power, and the like. Perfect support of MU MIMO is possible up to the number of available high quality RF chains, but more users might be served if some degradation is accepted for these additional users.
  Due to the dumb booster antennas, the high quality RF frontends can be implemented with significantly lower Tx power, which makes them relatively cheap as well despite the high level requirements with respect, e.g., to linearity. Note, typically costs for RF front ends decrease with a more than linear decrease with decreasing Tx power requirements.
  By lower-than-Nyquist transmission and over-the-air combining of two low rate Tx signals from two or more adjacent antenna elements, requirements for RF-filters are significantly reduced, allowing for low size and low cost implementations.

The following are possible exemplary embodiments. Example 1. An apparatus, comprising: a plurality of first radio frequency chains configured to be able to be coupled to a plurality of first antennas from an antenna array; and a plurality of second radio frequency chains configured to be able to be coupled to a plurality of second antennas from the antenna array, wherein the first and second antennas are different; wherein the first and second radio frequency chains are configured to create radio frequency signals from baseband signals, wherein the first radio frequency chains have a certain functionality, and wherein the second radio frequency chains have a reduced functionality relative to the certain functionality of the first radio frequency chains.

2. The apparatus of example 1, wherein the certain functionality of the first radio frequency chains is based at least in part on a plurality of features and wherein the second radio frequency chains have a reduced functionality because one or more features for the second radio frequency chains are relaxed relative to identical one or more features for the first radio frequency chains. 3. The apparatus of example 1, further comprising the antenna array.

4. The apparatus of example 1, wherein the first antennas have characteristics different from the characteristics of the second antennas. 5. The apparatus of example 1, wherein at least one of the second radio frequency chains comprises a power amplifier having only two states: an on state where the power amplifier transmits at full power; and an off state where the power amplifier is silent. 6. The apparatus of example 5, wherein at least one of the first radio frequency chains comprises a second power amplifier able to amplify a signal over a range of powers. 7. The apparatus of example 6, wherein at least one of the first radio frequency chains runs a first rate and wherein the power amplifier for the at least one of the second radio frequency chains is switched between the on and off states at a rate that is less than the first rate. 8. The apparatus of example 7, wherein the power amplifier for the at least one of the second radio frequency chains is switched between the on and off states at a rate that is half of the first rate or less than half of the first rate. 9. The apparatus of example 6, wherein at least one of the first radio frequency chains runs at first rate and wherein a signal coupled to the output of the power amplifier for the at least one of the second radio frequency chains is switched between an output routed toward the antenna and between a resistor to ground, wherein the switching occurs at a rate that is less than the first rate and the power amplifier is kept in the on state.

10. The apparatus of example 9, wherein the switching between the output routed toward the antenna and between the resistor to ground for the at least one of the second radio frequency chains occurs at a rate that is half of the first rate or less than half of the first rate. 11. The apparatus of example 5, wherein the at least one of the second radio frequency chains comprises a phase shifter configured to receive base band information and to output a shifted signal to the power amplifier, and comprises a filter that filters the output of the power amplifier and creates a filtered output able to be coupled to one of the plurality of second antennas. 12. The apparatus of example 11, wherein the at least one of the first radio frequency chains comprises a digital to analog converter that accepts a digital baseband signal and creates an analog baseband signal, a multiplier that multiplies the analog baseband signal by a local oscillator signal to create a radio frequency signal that is coupled to the second power amplifier, and a second filter that filters an amplified signal from the second power amplifier and creates a filtered output able to be coupled to one of the plurality of first antennas, wherein the second filter is implemented with a set of features and the filter in the at least one of the second radio frequency chains is implemented with features that are relaxed relative to the set of features for the second filter.

13. The apparatus of example 12, wherein the digital-to-analog converter for the at least one of the first radio frequency chains operates on a plurality of bits from the digital baseband signal and wherein the at least one of the second radio frequency chains does not have an analog-to-digital converter or has a single-bit analog-to-digital converter. 14. The apparatus of example 12, wherein the second filter for the at least one of the first radio frequency chains has a predetermined set of features and wherein the first filter for the at least one of the second radio frequency chains lacks one or more of the set of features or has one or more features that are relaxed relative to features in the set of features for the at least one of the first radio frequency chains. 15. The apparatus of example 1, wherein one or more sets of multiple second radio frequency chains are configured to operate at a rate that is less than a full rate at which the first radio frequency chains operate and wherein different ones of each set of the multiple second radio frequency chains are delayed by differing portions of a time slot, wherein over-the-air combination of transmission signals from each set will allow a receiver to form full-rate signals.

16. The apparatus of example 15, wherein each of the one or more sets of multiple second radio frequency chains have a pair of second radio frequency chains. 17. The apparatus of example 1, further comprising informing the user equipment that a certain set of channel state information is for the plurality of first radio frequency chains and an other set of channel state information is for the second radio frequency chains. 18. The apparatus of example 17, wherein the channel state information for the certain set is different from the channel state information for the other set.

19. The apparatus of example 1, further comprising one or more processors and one or more memories including computer program code, wherein the one or more memories and the computer program code configured, with the one or more processors, to cause the apparatus to perform at least the following: to select precoding to meet a selected number of multiple beams and corresponding user equipment; to select sets of multiple antennas for the second radio frequency chains; to configure sets of the second radio frequency chains corresponding to the selected multiple antennas to provide over-the-air combining of less than full rate switched signals. 20. The apparatus of example 1, further comprising one or more processors and one or more memories including computer program code, wherein the one or more memories and the computer program code configured, with the one or more processors, to cause the apparatus to perform at least the following: to perform coarse precoding of the antenna array to meet a selected number of multiple beams and user equipment, the coarse precoding using the plurality of second radio frequency chains; and to perform fine precoding of the antenna array to meet the selected number of multiple beams and the user equipment, the fine precoding using the plurality of first radio frequency chains. 21. The apparatus of example 1, further comprising using the antenna array to perform beamforming with multiple beams to multiple user equipment.

22. An apparatus, comprising: a base station comprising: a plurality of first radio frequency chains configured to be able to be coupled to a plurality of first antennas from an antenna array; and a plurality of second radio frequency chains configured to be able to be coupled to a plurality of second antennas from the antenna array, wherein the first and second antennas are different; wherein the first and second radio frequency chains are configured to create radio frequency signals from baseband signals, wherein the first radio frequency chains have a certain functionality, and wherein the second radio frequency chains have a reduced functionality relative to the certain functionality of the first radio frequency chains.

23. A method, comprising: for an apparatus comprising a plurality of first radio frequency chains able to be coupled to a plurality of first antennas from an antenna array, configuring a plurality of second radio frequency chains to perform precoding of the antenna array to meet a selected multiple number of beams to multiple users, wherein the plurality of second radio frequency chains are configured to be able to be coupled to a plurality of second antennas from the antenna array, wherein the first and second antennas are different, wherein the first radio frequency chains also perform precoding of the multiple number of beams to the multiple users, wherein the first and second radio frequency chains are configured to create radio frequency signals from baseband signals, wherein the first radio frequency chains have a certain functionality, and wherein the second radio frequency chains have a reduced functionality relative to the certain functionality of the first radio frequency chains; and performing beamforming with the multiple beams to the multiple users.

24. The method of example 23, wherein the certain functionality of the first radio frequency chains is based at least in part on a plurality of features and wherein the second radio frequency chains have a reduced functionality because one or more features for the second radio frequency chains are relaxed relative to identical one or more features for the first radio frequency chains.

25. The method of example 23, wherein at least one of the first radio frequency chains comprises a second power amplifier able to amplify a signal over a range of powers, and wherein at least one of the second radio frequency chains comprises a power amplifier having only two states: an on state where the power amplifier transmits at full power; and an off state where the power amplifier is silent.

26. The method of example 25, wherein at least one of the first radio frequency chains runs a first rate and wherein the method further comprises switching the power amplifier for the at least one of the second radio frequency chains between the on and off states at a rate that is less than the first rate.

27. The method of example 25, wherein at least one of the first radio frequency chains runs at first rate and wherein the method further comprises switching a signal coupled to the output of the power amplifier for the at least one of the second radio frequency chains between an output routed toward the antenna and between a resistor to ground, wherein the switching occurs at a rate that is less than the first rate and the power amplifier is kept in the on state.

Embodiments (or portions thereof) of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 4. A computer-readable medium may comprise a computer-readable storage medium (e.g., memory(ies) 425, 455 or other device) that may be any media or means that can contain or store the instructions for use by or in connection with an instruction execution system, apparatus, or device, such as a computer. A computer readable storage medium does not, however, encompass propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

Acronyms used in this application or the drawings are defined as follows.

3GPP Third Generation Partnership Project
5G Fifth Generation
ACLR Adjacent Channel Leakage Ratio
ADC Analog to Digital Converter
AE Antenna Element
BB baseband
CDF Cumulative Distribution Function
CPRI Common Public Radio Interface
CSI-RS Channel State Information-Reference Signal
DAC Digital to Analog Converter
dBm Decibel-milliwatts
DL downlink (from base station to UE)
eNB evolved NodeB, an LTE base station
EU European Union
FDD Frequency Division Duplex
GHz giga-Hertz
IC Integrated Circuit
LTE Long Term Evolution
$m^3$ cubic meter
MCS Modulation and Coding Scheme
METIS Mobile and wireless communications Enablers for the Twenty-twenty Information Society
MHz mega-Hertz
MIMO Multiple Input, Multiple Output
MU-MIMO Multi-User MIMO
PA Power Amplifier
PAE Power Amplifier Efficiency
PMI Pre-coding Matrix Indicator
RF Radio Frequency
Rx reception or receiver
SPDT Single Position Double Throw
SRS Sounding Reference Signal
TDD Time-Division Duplex
Tx transmission or transmitter
UE User Equipment, e.g., a wireless device
UL uplink (from UE to base station)

What is claimed is:

1. An apparatus, comprising:
a plurality of first radio frequency chains configured to be able to be coupled to a plurality of first antennas from an antenna array; and
a plurality of second radio frequency chains configured to be able to be coupled to a plurality of second antennas from the antenna array, wherein the first and second antennas are different;
wherein the first and second radio frequency chains are configured to create radio frequency signals from baseband signals, wherein the first radio frequency chains have a certain functionality, and wherein the second radio frequency chains have a reduced functionality relative to the certain functionality of the first radio frequency chains.

2. The apparatus of claim 1, wherein the certain functionality of the first radio frequency chains is based at least in part on a plurality of features and wherein the second radio frequency chains have a reduced functionality because one or more features for the second radio frequency chains are relaxed relative to identical one or more features for the first radio frequency chains.

3. The apparatus of claim 1, wherein the first antennas have characteristics different from the characteristics of the second antennas.

4. The apparatus of claim 1, wherein at least one of the second radio frequency chains comprises a power amplifier having only two states: an on state where the power amplifier transmits at full power; and an off state where the power amplifier is silent.

5. The apparatus of claim 4, wherein at least one of the first radio frequency chains runs a first rate and wherein the power amplifier for the at least one of the second radio frequency chains is switched between the on and off states at a rate that is less than the first rate.

6. The apparatus of claim 5, wherein the power amplifier for the at least one of the second radio frequency chains is switched between the on and off states at a rate that is half of the first rate or less than half of the first rate.

7. The apparatus of claim 4, wherein at least one of the first radio frequency chains runs at first rate and wherein a signal coupled to the output of the power amplifier for the at least one of the second radio frequency chains is switched between an output routed toward the antenna and between a resistor to ground, wherein the switching occurs at a rate that is less than the first rate and the power amplifier is kept in the on state.

8. The apparatus of claim 4, wherein the at least one of the second radio frequency chains comprises a phase shifter configured to receive base band information and to output a shifted signal to the power amplifier, and comprises a filter that filters the output of the power amplifier and creates a filtered output able to be coupled to one of the plurality of second antennas.

9. The apparatus of claim 8, wherein the at least one of the first radio frequency chains comprises a digital to analog converter that accepts a digital baseband signal and creates an analog baseband signal, a multiplier that multiplies the analog baseband signal by a local oscillator signal to create a radio frequency signal that is coupled to a second power amplifier, and a second filter that filters an amplified signal from the second power amplifier and creates a filtered output able to be coupled to one of the plurality of first antennas, wherein the second filter is implemented with a set of features and the filter in the at least one of the second radio frequency chains is implemented with features that are relaxed relative to the set of features for the second filter.

10. The apparatus of claim 9, wherein the digital-to-analog converter for the at least one of the first radio frequency chains operates on a plurality of bits from the digital baseband signal and wherein the at least one of the second radio frequency chains does not have an analog-to-digital converter or has a single-bit analog-to-digital converter.

11. The apparatus of claim 9, wherein the second filter for the at least one of the first radio frequency chains has a predetermined set of features and wherein the first filter for the at least one of the second radio frequency chains lacks one or more of the set of features or has one or more features that are relaxed relative to features in the set of features for the at least one of the first radio frequency chains.

12. The apparatus of claim 1, wherein one or more sets of multiple second radio frequency chains are configured to operate at a rate that is less than a full rate at which the first radio frequency chains operate and wherein different ones of each set of the multiple second radio frequency chains are delayed by differing portions of a time slot, wherein over-the-air combination of transmission signals from each set will allow a receiver to form full-rate signals.

13. The apparatus of claim 12, wherein each of the one or more sets of multiple second radio frequency chains have a pair of second radio frequency chains.

14. The apparatus of claim 1, further comprising informing a user equipment that a certain set of channel state information is for the plurality of first radio frequency chains and an other set of channel state information is for the plurality of second radio frequency chains.

15. The apparatus of claim 14, wherein the channel state information for the certain set is different from the channel state information for the other set.

16. The apparatus of claim 1, further comprising one or more processors and one or more memories including computer program code, wherein the one or more memories and the computer program code configured, with the one or more processors, to cause the apparatus to perform at least the following:
to select precoding to meet a selected number of multiple beams and corresponding user equipment;
to select sets of multiple antennas for the second radio frequency chains;
to configure sets of the second radio frequency chains corresponding to the selected multiple antennas to provide over-the-air combining of less than full rate switched signals.

17. The apparatus of claim 1, further comprising one or more processors and one or more memories including computer program code, wherein the one or more memories and the computer program code configured, with the one or more processors, to cause the apparatus to perform at least the following:
to perform coarse precoding of the antenna array to meet a selected number of multiple beams and user equipment, the coarse precoding using the plurality of second radio frequency chains; and
to perform fine precoding of the antenna array to meet the selected number of multiple beams and the user equipment, the fine precoding using the plurality of first radio frequency chains.

18. The apparatus of claim 1, further comprising using the antenna array to perform beamforming with multiple beams to multiple user equipment.

19. The apparatus of claim 1, further comprising the antenna array.

20. The apparatus of claim 4, wherein at least one of the first radio frequency chains comprises a second power amplifier able to amplify a signal over a range of powers.

21. The apparatus of claim 7, wherein the switching between the output routed toward the antenna and between the resistor to ground for the at least one of the second radio frequency chains occurs at a rate that is half of the first rate or less than half of the first rate.

22. A method, comprising:
for an apparatus comprising a plurality of first radio frequency chains able to be coupled to a plurality of first antennas from an antenna array, configuring a plurality of second radio frequency chains to perform precoding of the antenna array to meet a selected multiple number of beams to multiple users, wherein the plurality of second radio frequency chains are configured to be able to be coupled to a plurality of second antennas from the antenna array, wherein the first and second antennas are different, wherein the first radio frequency chains also perform precoding of the multiple number of beams to the multiple users, wherein the first and second radio frequency chains are configured to create radio frequency signals from baseband signals, wherein the first radio frequency chains have a certain functionality, and wherein the second radio frequency chains have a reduced functionality relative to the certain functionality of the first radio frequency chains; and performing beamforming with the multiple beams to the multiple users.

23. The method of claim 22, wherein the certain functionality of the first radio frequency chains is based at least in part on a plurality of features and wherein the second radio frequency chains have a reduced functionality because one or more features for the second radio frequency chains are relaxed relative to identical one or more features for the first radio frequency chains.

24. The method of claim 22, wherein at least one of the first radio frequency chains comprises a second power amplifier able to amplify a signal over a range of powers, and wherein at least one of the second radio frequency chains comprises a power amplifier having only two states: an on state where the power amplifier transmits at full power; and an off state where the power amplifier is silent.

25. The method of claim 24, wherein at least one of the first radio frequency chains runs a first rate and wherein the method further comprises switching the power amplifier for the at least one of the second radio frequency chains between the on and off states at a rate that is less than the first rate.

26. The method of claim 24, wherein at least one of the first radio frequency chains runs at first rate and wherein the method further comprises switching a signal coupled to the output of the power amplifier for the at least one of the second radio frequency chains between an output routed toward the antenna and between a resistor to ground, wherein the switching occurs at a rate that is less than the first rate and the power amplifier is kept in the on state.

27. A computer-readable storage medium bearing computer program code embodied therein that cause an apparatus, in response to execution of the computer program code, to perform:

for the apparatus that comprises a plurality of first radio frequency chains able to be coupled to a plurality of first antennas from an antenna array, configuring a plurality of second radio frequency chains to perform precoding of the antenna array to meet a selected multiple number of beams to multiple users, wherein the plurality of second radio frequency chains are configured to be able to be coupled to a plurality of second antennas from the antenna array, wherein the first and second antennas are different, wherein the first radio frequency chains also perform precoding of the multiple number of beams to the multiple users, wherein the first and second radio frequency chains are configured to create radio frequency signals from baseband signals, wherein the first radio frequency chains have a certain functionality, and wherein the second radio frequency chains have a reduced functionality relative to the certain functionality of the first radio frequency chains; and performing beamforming with the multiple beams to the multiple users.

28. The computer-readable storage medium of claim 27, wherein the certain functionality of the first radio frequency chains is based at least in part on a plurality of features and wherein the second radio frequency chains have a reduced functionality because one or more features for the second radio frequency chains are relaxed relative to identical one or more features for the first radio frequency chains.

29. The computer-readable storage medium of claim 27, wherein the first antennas have characteristics different from the characteristics of the second antennas.

\* \* \* \* \*